July 26, 1966
G. MORESSEE ETAL
3,263,143
FREQUENCY CONVERTER
Filed Feb. 26, 1962
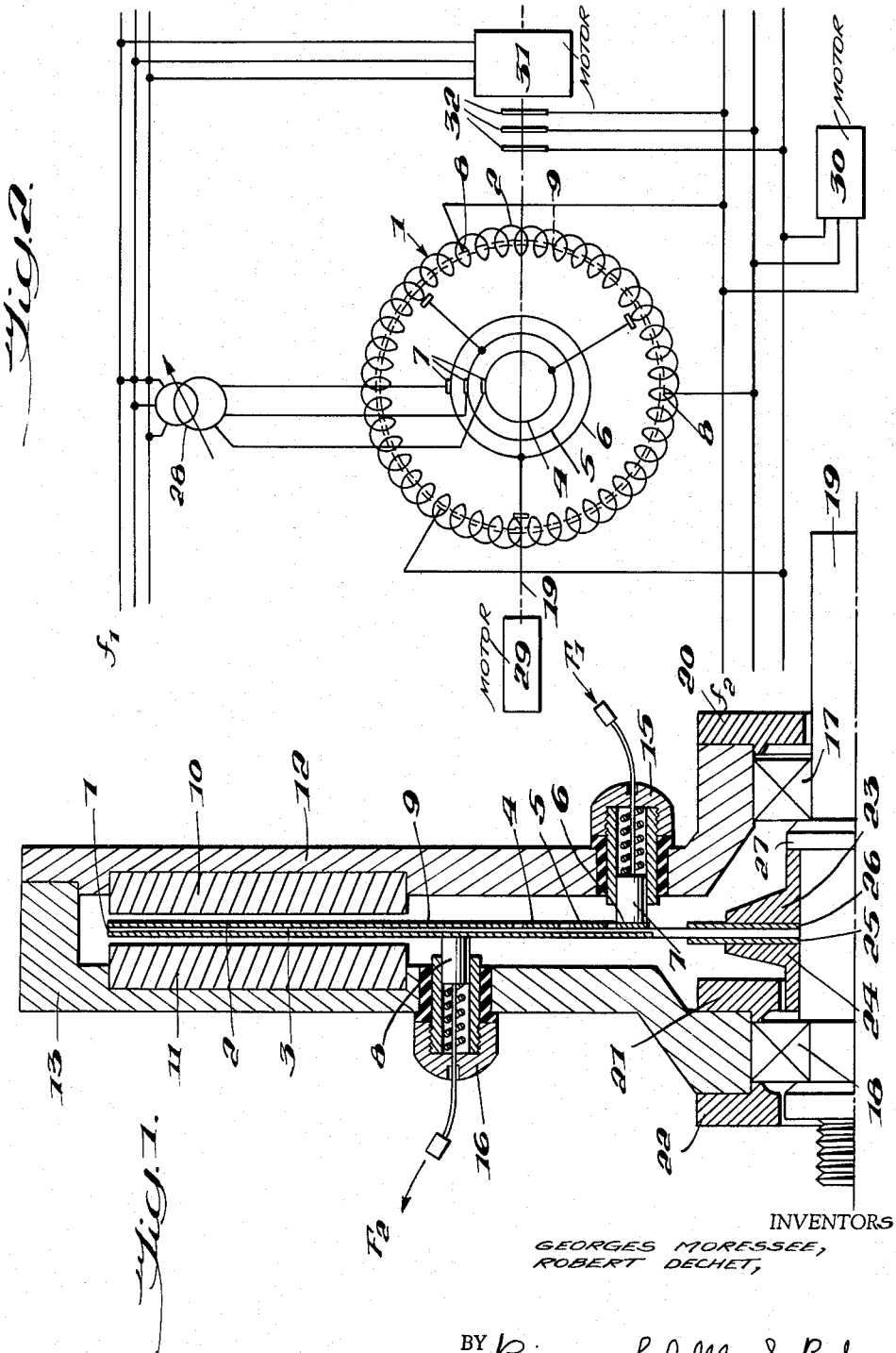
INVENTORS
GEORGES MORESSEE,
ROBERT DECHET,
BY Pierre, Schiffler & Parker
ATTORNEYS

United States Patent Office 3,263,143
Patented July 26, 1966

3,263,143
FREQUENCY CONVERTER
Georges Moressee, Neuilly-sur-Seine, and Robert Dechet, Boulogne-sur-Seine, France, assignors to Cie Electro-Mecanique, Paris, France, a body corporate of France
Filed Feb. 26, 1962, Ser. No. 175,627
Claims priority, application France, Mar. 9, 1961, 855,090, Patent 1,291,002
3 Claims. (Cl. 318—197)

The present invention relates to the use of a rotating electric machine including a disk-shaped rotor presenting a flat lamellar conductor winding and rotating in a plane axial gap, the machine being designed to function as a frequency converter.

Frequency converters have a direct current armature whose winding is connected, on one hand, to a set of slip rings and, on the other, to a collector, that is, to two sets of brushes, and a stator without inductor winding serving mainly to close the flux produced by the armature.

It is known that the stator of such a converter may be equipped with a compensation winding for the sole purpose of opposing to the magnetomotive force of the armature an equal magnetomotive force of contrary sense. In this case, the frequency converter is said to be "compensated."

Whether or not compensated, the known $2p$ poles frequency converter shows the following properties:

(1) Fed by a three-phase network of frequency $f_1$ through three slip rings connected to properly chosen points of the secondary winding, the latter generates a field rotating at the synchronous speed $n_s$ which is constant in relation to the armature, where $$n_s = \frac{60 f_1}{p}$$

This rotating field induces, in turns of the armature, an alternating electro-motive force of frequency $f_1$.

(2) On the other hand, the frequency $f_2$ of the electromotive forces at the collector depends on the speed of rotation of the rotating field in relation to a fixed point in space.

If the rotor of the frequency converter is driven at a speed $n$, contrary to the direction of rotation of the rotating field, which is the most frequent case, this frequency $f_2$ will be given by the relation:

$$f_2 = f_1 \frac{n_s - n}{n_s}$$

In particular, if the rotor of the converter is driven contrary to the direction of the field at the synchronous speed $n_s$, the frequency $f_2$ will be zero and a direct current voltage will be collected at the brushes of the collector.

(3) The voltage at the slip rings and that at the collector, although of different frequencies, are of equal value.

However, they present, relatively to each other, a phase difference which is a function of the position of the brushes of the collector in relation to those of the slip rings.

Therefore, a displacement of the former corresponds to a rotation of the axes of the rotor winding in relation to the rotating field, that is, to a variation in the time of the phase.

Besides the above properties, the machine according to the invention presents certain advantages which will be evident as the description proceeds.

Like the uncompensated converter of conventional design, the machine according to the present invention has no salient poles and stator windings.

It presents the further advantage of not requiring cutout metal laminations as the gap may be defined simply by suitable magnetic pieces functioning as yokes and serving to close the magnetic circuit. There are the additional advantages which result from a magnetically plane gap offering a constant reluctance.

In accordance with the description in French Patent No. 1,236,080, of June 2, 1959, the rotor of the frequency converter of the present invention is a disk without iron whose flat winding, formed of bare lamellar conductors, presents flat circular tracks functioning as slip rings on which are applied the current feed brushes at the frequency $f_1$, other current tapping brushes at frequency $f_2$ being in contact with the bare conductors belonging to the actual winding, the latter brushes being distributed over a circular zone of the winding acting as collector.

The following description, illustrated by the annexed drawings given by way of non-limitative example, will explain how the invention can be carried into effect.

FIGURE 1 is a schematic axial half-section of a converter according to the present invention, only one feed brush and one current tapping brush having been represented to simplify the drawing.

FIGURE 2 is a wiring diagram showing notably the contacts of the various brushes with the tracks or the rotor winding.

The converter represented in the drawings includes a disk-type rotor 1 carrying a flat winding 2 of bare lamellar conductors supported, on both faces of the winding, by a thin disk-shaped insulating support 3, which winding may be obtained by the printed circuit technique or other suitable technique.

On one of the faces of the disk are provided three flat circular tracks 4, 5, 6 which may be made at the same time as the winding or separately, by the same techniques, and onto which the current feed brushes 7 lead, perpendicular to the plane of the disk.

Similar current tapping brushes 8, likewise perpendicular to the plane of the disk, lead directly onto the bare conductors on the other face of disk 3 at three properly distributed points of the circular zone 9 acting as collector and represented in dotted lines in FIGURE 2.

Rotor 1 rotates in a plane gap delimited by two annular magnetic yokes 10, 11 of soft ferrite of weak coercitive field or simply of spirally wound magnetic sheet, which serve to close the magnetic circuit and which are centered and fixed on the cheek plates 12, 13 forming a casing, of non-magnetic metal, for example, a light alloy known as "Alpax," "Zamac," etc.

In the cheek plate 12 are mounted the brush holders 15 associated with the brushes 7 leading respectively onto the tracks 4, 5, 6. Similar brush-holders 16, associated with the brushes 8, are mounted in the opposite cheek plate 13.

The casing formed by the cheek plates 12, 13, supports the journal bearings 17, 18 of the shaft 19 of the machine, these bearings preferably including ball or needle bearings whose outer race is centered in each of the cheek plates 12, 13, the protection and security of these rolling bearings being insured by end cover plates 20, 21, 22 fastened on the casing.

The insulating disk 3 is pinched in its central part between two half-hubs 23, 24 of plastic material or of metal. In the later case, as represented in FIGURE 1, insulating washers 25, 26 are interposed between the insulating disk 3 and the half-hubs 23, 24, the half hub 23 abutting against a shoulder 27 of shaft 19, thus defining in space the position of the rotor and assuring with the half-hub 24, its hold and its drive, for example, by tight fit on shaft 19. The journal bearing 18, blocked longitudinally, prevents any axial displacement and absorbs any axial thrust due to magnetic attraction or any external mechanical cause.

The electric machine thus described functions well as a frequency converter, this operation being shown diagrammatically in FIGURE 2 where one has simply represented the rotor 1 with its winding 2, its three brushes 7 on the tracks 4, 5, 6 and its brushes 8 (of which three are represented), leading onto the circular zone 9 of the winding serving as collector.

FIGURE 2 shows that the brushes 7 may be connected, by the interposition of an adjustable transformer 28, to the three-phase feed network of frequency $f_1$, the shaft 19 of the machine being driven by a suitable motor 29 of variable speed $n$, generally in the direction contrary to that of the field rotating at the synchronous speed $n_s$.

Between the brushes 8 there will be collected in this case an alternating voltage of frequency $f_2$, in direct ratio with the driving speed $n$ and given by the equation $$f_2 = f_1 \frac{n_s - n}{n_s}$$

It is seen that when the driving rotor of the converter at a speed $n$ equal and opposite to the synchronous speed $n_s$ of the rotating field, there will be collected at the brushes 8 a direct current voltage.

Thus operated, the converter therefore has a certain similarity with the commutator machine operating in direct; however, it differs therefrom in that the distribution of the voltage between the brushes 8 may be different according to the position taken by the rotating field in relation to the rotor winding, while in the commutator machine it is always the same, since the position of the field is fixed by the salient poles of the stator.

The frequency converter thus described can receive two principal applications of particular interest.

The first relates to the speed adjustment of asynchronous motors, and for this it suffices to connect the brushes 8 to the stator terminals of the asynchronous motor to be regulated.

This application has been diagrammatically represented in FIGURE 2, in which a network having the frequency $f_1$ feeds, through a regulating transformer 28 and the current feed brushes 7, the rotor of the converter, which in its turn feeds, at the frequency $f_2$ and by interposition of the brushes 8, a secondary network to which is connected the asynchronous motor 30 to be regulated.

If the power absorbed by the latter is weak, the converter, whose role is to transmit this power, may be small; its inherent losses and magnetizing power will therefore be minimal.

If there is available a variable speed drive motor 29, adapted to the characteristics of the available feed network, or equipped with a separate speed changer, whether mechanical, hydraulic or of other construction, it will be possible to obtain a simple control and a high efficiency of the motor 30.

It would be likewise possible, by dimensioning the converter accordingly, to feed simultaneously several asynchronous motors of lower power, constituting, for example, individual controls of several driven organs, whether identical or not, but each requiring a relatively low power. This case has not been illustrated in the drawing.

Thus, the set of the control motors may be the object of a simultaneous speed regulation, which may offer an appreciable advantage in several fields of applications, for example, in the textile industry for the driving of spindles.

The second application relates to the excitation of an asynchronous ring motor, either for speed regulation or for improvement of the power factor.

It is known, in fact, that by introducing in the rotor circuit of an asynchronous machine an appropriate voltage, it is possible to act on the speed as well as on its power factor.

In vectorial representation:

An external voltage directed in the same sense as the electromotive rotor force, that is, the electromotive slipping force, or in the sense opposite to the latter, will have as its effect a speed variation, with possibility of exceeding the synchronous speed;

An external voltage perpendicular to the electromotive rotor force and leading the latter by $\pi/2$ will cause an improvement of the power factor with the possibility of cancelling any phase displacement between the primary current and the feed voltage of the stator.

In both cases, the external voltage to be introduced in the rotor circuit of the asynchronous motor to be regulated or compensated should have the same frequency as the electromotive rotor force, that is, a relatively low frequency.

This application is illustrated in FIGURE 2: At frequency $f_2$, the rotor of the converter feeds the slip rings 32 of an asynchronous motor 31.

It should be stressed that, if the stator feed of motor 31 is insured by the same network at frequency $f_1$ as that of the converter, the drive of the latter is insured not by an auxiliary motor 29 any more but by the asynchronous motor 31 itself.

According to the known procedures, the adjustment of the phase of the voltage collected at the brushes 8 is easily insured either by an angular displacement between the two plates of the coupling which links the converter and the asynchronous motor 31, or preferably, by a displacement of the brushes 8, as has been indicated above.

It is thus possible, in particular, at all loads of the asynchronous motor 31, not only to obtain the phase compensation, but also to produce reactive energy, including zero load, that is, idling.

While the "uncompensated" frequency converter of conventional design offers difficulties of commutation which lead to narrowly limiting the voltage between plates of the collector, the converter according to the invention avoids this disadvantage because of the absence of iron at the rotor.

It retains, however, the advantages of the former in relation to the "compensated" converter, of more cumbersome execution, notably that of smaller copper losses.

In conclusion, it is obvious that modifications may be introduced in the form of construction and in the applications which have just been described, notably by substitution of technical means having the same or similar effects, without therefore leaving the scope of the present invention as defined in the appended claims.

We claim:

1. In a frequency converter, the combination comprising a disk-shaped rotor including on opposite faces thereof a flat winding and rotatable in a plane axial gap, a stator, magnetic members located on said stator at opposite faces of said rotor disk and delimiting said planar axial air gap, said magnetic members being parts of a yoke which closes the magnetic circuit, slip rings on said rotor in the form of concentric circular conductive tracks, connections between said slip rings and selected points on that part of said rotor winding which lies on one face of said rotor disk, a first set of brushes engaging said slip rings and through which an alternating current input at a given frequency is applied to said rotor winding from a network, and a second set of brushes slidably engaging bare conductor portions of that part of said rotor winding which lies on the opposite face of said rotor disk, the brushes of said second set acting as collectors for taking off current at a different frequency dependent upon the frequency of rotation of said rotor.

2. A frequency converter as defined in claim 1 for use in the regulation of a parameter, such as speed, of an asynchronous motor wherein the brushes of said second set are connected to terminals on the stator of said asynchronous motor, and wherein a variable speed motor is provided for driving the rotor of the converter.

3. A frequency converter as defined in claim 1 for use in the regulation of a parameter such as speed, or power factor, or both, of an asynchronous motor wherein the brushes of said second set are connected to the slip rings on said asynchronous motor, and the stator windings of said asynchronous motor are connected to the same alternating current supply source which feeds said rotor winding of said converter through said first set of brushes.

References Cited by the Examiner

UNITED STATES PATENTS

| | | | |
|---|---|---|---|
| 1,610,522 | 12/1926 | Hellmund | 321—64 |
| 2,501,543 | 3/1950 | Short | 321—64 |
| 2,725,490 | 11/1955 | Pestarini | 321—63 |
| 3,050,650 | 8/1962 | Henry-Baudot | 310—268 |
| 3,144,574 | 8/1964 | Henry-Baudot | 310—237 |

OTHER REFERENCES

Electronic Design: "Printed Circuit Armature Now in D.C. Motor," March 4, 1959, pp. 62–63.

LLOYD McCOLLUM, *Primary Examiner.*

JOHN F. COUCH, *Examiner.*

G. J. BUDOCK, G. GOLDBERG, *Assistant Examiners.*